Patented Nov. 8, 1949

2,487,563

UNITED STATES PATENT OFFICE 2,487,563

CATALYST FOR HYDROCARBON CONVERSION PROCESS

Edwin T. Layng, Jersey City, N. J., assignor to The M. W. Kellogg Company, Jersey City, N. J., a corporation of Delaware No Drawing. Application June 18, 1942, Serial No. 447,587

3 Claims. (Cl. 260—668)

This invention relates to improvements in hydrocarbon conversion processes utilizing catalyst compositions comprising a minor proportion of a catalytically active material in combination with a major proportion of an alumina carrier. More particularly, the invention relates to improvements in hydrocarbon conversion processes utilizing catalyst compositions comprising a major proportion of an alumina carrier in combination with a minor proportion of an activating oxide such as an oxide of a metal of the left-hand columns of groups IV, V and VI of the periodic table. More particularly, the invention relates to improvements in hydrocarbon conversion processes, such as hydrogenation, dehydrogenation, reforming and aromatization, by means of a catalyst composition comprising a major proportion of a carrier material comprising alumina in combination with a minor proportion of an activating oxide, such as molybdenum oxide. The invention also relates to an improved catalyst comprising a minor proportion of a catalytically active material in combination with a major proportion of a carrier comprising alumina, and methods for preparation thereof.

Catalyst compositions comprising minor proportions of catalytically active materials, such as oxides of metals of the left-hand columns of groups IV, V and VI of the periodic table, in combination with a major proportion of an alumina carrier material have been suggested for use in the promotion of many hydrocarbon conversion reactions. Such catalysts have been employed extensively in the treatment of liquid hydrocarbons in processes involving dehydrogenation and cyclization and other reactions incidental to the reforming of naphtha. For example, catalyst compositions comprising a minor proportion of molybdenum oxide in combination with a major proportion of alumina have gone into extensive use in the reforming of naphtha of low anti-knock value under conditions effective to dehydrogenate and cyclicize aliphatic hydrocarbons. Such catalytic compositions also are used in the dehydrogenation of normally gaseous paraffin hydrocarbons to form corresponding olefins and in the dehydrogenation of olefins, such as the dehydrogenation of butene to butadiene.

In the use of catalyst compositions of this character the hydrocarbon reactants are passed, in the vapor form ordinarily, through a fixed body, or mass, of granular catalytic material at the desired reaction temperature, the endothermic heat of reaction being supplied to the reaction zone. The conditions necessary for the hydrocarbon conversion reactions result in side reactions which cause the formation and deposition of high-boiling hydrocarbons which are readily converted by the heat of the reaction to solid carbonaceous deposits on the surfaces of the catalyst. Certain of the activating oxides, such as molybdenum oxide, are gradually reduced during the operating run from the state of oxidation representing maximum catalytic activity to lower states of oxidation and even to the metallic condition. This gradual reduction also has the effect of deactivating the catalyst.

The removal of carbonaceous deposits from the catalyst surfaces and the restoration of the activating oxide are accomplished ordinarily by passing an oxygen-containing gas such as a mixture of air and flue gas over the temporarily deactivated catalyst mass to burn the carbonaceous deposits from the catalyst surfaces and restore the activating oxide to the desired state of oxidation. The amount of oxygen in the gas is restricted ordinarily to a relatively low percentage, for example 2 to 4 per cent, so that the heat capacity of the regenerating gas is sufficient to prevent overheating of the catalyst mass by the combustion of the carbonaceous deposits.

Many of the activating oxides such as those of chromium and molybdenum are oxidized during the regeneration step to a relatively high state of oxidation. The higher oxides thus produced are reduced relatively rapidly during the initial period of the subsequent reaction step by contact with the hydrocarbon reactants or with hydrogen which is formed in the reaction zone or introduced with the hydrocarbon reactants to a lower state of oxidation. It is this lower, and apparently more stable, state of oxidation in which the activating oxides probably exhibit the greatest catalytic activity and from which they are slowly reduced to an even lower state of oxidation or to the metallic condition during the operating run.

Since the reduction reaction is exothermic the relatively rapid reduction of the activating oxide which occurs at the beginning of the operating run may cause an undesirable temperature rise in the reaction zone. The reduction reaction also consumes hydrogen which might otherwise assist in retarding the deposition of carbonaceous material on the catalyst surfaces. In order to avoid any undesirable fluctuation of the reaction temperature at the beginning of the run and in order to avoid any reduction in the desired concentration of hydrogen in the reaction zone it may be desirable to subject the regenerated catalyst mass to a preliminary reduction treatment prior to the repassage of the hydrocarbon reactants through the reaction zone. This is accomplished conveniently by contacting the catalyst mass with the hydrogen-containing gas which is ordinarily recycled to the reaction zone for admixture with the hydrocarbon reactants. Thereafter the passage of the hydrocarbon reaction mixture through the reaction zone along with the hydrogen-containing gas is initiated.

In any case, the oxidation and reduction of the activating ingredient of the catalyst represent a substantial part of the oxygen and hydrogen requirements of the process and result in the presence of water in the reaction zone which may have a deleterious effect on the catalyst and which must be separated from the reaction products. The oxygen requirement of the process is important, not because of the material cost of the oxygen but because of the bulk of the regenerating gas which must be passed through the reactor in the regeneration step. The bulk of the regenerating gas is many times the bulk of the oxygen contained therein so that the oxygen requirement of the process involves the handling, heating, compression, etc. of a substantial volume of regenerating gas. This represents a substantial part of the cost of the operation in terms of energy and apparatus costs. The hydrogen requirement of the operation, which is due to the reduction of the catalyst, requires supplying to the reaction zone a substantial quantity of hydrogen in addition to the amount which may be supplied thereto to maintain the proportion of hydrogen in the reaction zone which is necessary to retard the deposition of carbonaceous deposits on the catalyst surfaces.

The operating factors involved in the consumption of oxygen and hydrogen and the formation of water as a result of the successive oxidation and reduction of the activating ingredient of the catalyst ordinarily necessitate the use of the catalyst under conditions involving relatively long operating runs between regenerative steps and substantially preclude the use of a catalyst containing a substantial proportion of such an activating ingredient in operations which require the employment of relatively short periods between regenerative steps since each oxidation and reduction of the catalyst involves the same requirement of hydrogen and oxygen and the same production of water regardless of the quantity of carbon removed from the catalyst by oxidation.

It is an object of the invention to provide a hydrocarbon conversion process employing an improved catalyst of the character described wherein the same activity level is attained with the use of a catalyst containing a substantially smaller proportion of the activating ingredient which is subject to oxidation and reduction during the regeneration and reaction steps of the process whereby the oxygen and hydrogen requirements of the process are substantially reduced, thus reducing the cost of the operation or permitting the employment of operations involving relatively short reaction periods and frequent regenerative steps. It is a further object of this invention to provide a hydrocarbon conversion process employing an improved catalyst composition which effects improved results in the form of superior products and higher yields. It is a further object of the invention to provide an improved catalyst composition and a preferred method of preparation to obtain catalysts of maximum activity.

The alumina employed preferably is a synthetic or natural material which has been formed as a hydrate and which has been substantially dehydrated at temperatures in the range of 600° and 1400° F. Preferably the aluminum hydrate is heated to substantially complete dehydration at 1200° F. One form of alumina which may be employed in the process is activated alumina which is prepared by removing and dehydrating the scale which is deposited on the walls of the precipitation tanks employed in the Bayer process. Another form of alumina which may be employed in the preparation of the improved catalyst is obtained by dehydration of synthetic aluminum hydrate.

Synthetic aluminum hydrate may be obtained by precipitation from a sodium aluminate solution by the Bayer process. In this process bauxite is treated with a strong solution of caustic soda in a closed vessel under steam pressure. The resulting sodium aluminate solution is filtered to separate the insoluble impurities and is then passed to the precipitating tanks. A small amount of freshly precipitated aluminum hydrate is added to the solution, and the contents of the precipitating tanks are then stirred for some time to effect precipitation of a large proportion of the alumina in the solution, which occurs as the result of hydrolysis. By another method of preparation bauxite is fused with sodium carbonate to form sodium aluminate. The fused mass is then leached with hot water, and the resulting sodium aluminate solution is filtered. The aluminum hydrate is precipitated from the sodium aluminate solution by the passage of carbon dioxide therethrough.

While specific reference is made in the following description to the use of activated alumina or aluminum hydrate in the preparation of the improved catalyst, it is to be understood that the invention is not limited thereby and that the advantages of the invention are obtained in the use of any suitable alumina of the general character described above, such as alumina gel, which may be prepared, for example by peptizing aluminum hydrate or by precipitation from aluminum sulfate solutions with ammonia.

In the following description of the invention the minor proportion of the more active ingredient employed in combination with a major proportion of the alumina is referred to as the activating oxide. As activating oxides which may be combined with alumina to form a catalyst of high activity in the promotion of hydrocarbon reactions reference is made to the oxides of metals of the left-hand columns of groups IV, V and VI of the periodic table, including chromium, molybdenum, tungsten, uranium, vanadium, columbium, tantalum, titanium, zirconium, cerium, hafnium and thorium. In the specific examples set forth below molybdenum oxide is employed as the activating oxide in combination with the alumina supporting material. It is to be understood, however, that the improvements represented by this invention are applicable to catalysts comprising a major proportion of alumina and other activating oxides and the hydrocarbon conversion processes employing such other catalyst compositions.

In accordance with the present invention the catalyst composition comprising a major proportion of alumina in combination with a minor proportion of an activating oxide is modified by the incorporation therein of silica in a proportion sufficient to enhance the catalytic activity of the catalyst composition but insufficient to diminish the activity of the catalyst in promoting the desired reactions which are produced by the catalyst composition in the absence of silica. For example, in the modification of the catalyst composition for use in promoting the reforming of naphthas to gasoline constituents of high antiknock value the silica is incorporated in the catalyst composition in a proportion sufficient to enhance the catalytic activity of the catalyst composition but insufficient to diminish substantially the dehydrogenating and aromatizing reactions produced by the catalyst composition in the absence of the silica. As a further modification of the improved catalyst minor proportions of titania and/or iron oxide ($Fe_2O_3$) may be incorporated in the catalyst composition in addition to the silica.

The silica may be incorporated in the catalyst composition by any method which imparts to the catalyst the improved characteristics which are the beneficial effect of the addition of silica. In accordance with the preferred method of preparation silica is combined with the other ingredients of the catalyst composition in the form of silica gel when the alumina is employed in the form of aluminum hydrate or activated alumina. However, the invention is not limited to the use of catalysts prepared from silica gel. For example, other forms of silica may be employed if the alumina is present in the form of alumina gel or if the conditions of mixing the ingredients are regulated to effect substantial peptization of the silica.

In the preparation of catalyst compositions comprising a small proportion of an activating oxide and a major proportion of alumina the ingredients may be combined by forming the alumina into a paste or moist mass with a solution containing a sufficient quantity of a molybdenum compound to form the desired proportion of the molybdenum oxide in the finished catalyst, or the alumina may be immersed in a solution of the molybdenum compound under conditions effective to cause the absorption of a sufficient amount of the molybdenum compound solution to deposit in and on the alumina particles the desired quantity of the molybdenum compound. The first-mentioned method, involving the formation of a paste or moist mass, is preferred in connection with this invention because of the relative ease of incorporating the silica. However, the invention is not limited to the use of catalysts prepared in that manner since the improved catalyst may be preferred by the method involving immersion or any other suitable method of combining the desired ingredients of the composition.

While the activating oxide, such as molybdenum oxide, may be incorporated in the mixture as such, it is preferred, in order to obtain catalysts of maximum activity, to incorporate the activating oxide in the form of a solution of a soluble compound of the metal, the soluble compound being one which upon heating to a temperature insufficiently high to injure the catalyst structure, decomposes to produce the desired oxide. For example, molybdenum oxide may be incorporated in the catalyst composition in the form of ammonium molybdate.

The quantity of molybdenum oxide required in the improved catalyst composition varies ordinarily from 1 to 12 weight per cent, although smaller or larger proportions may be employed. Maximum activity is obtained in catalysts containing molybdenum oxide in the range of 6 to 9 weight per cent. Proportions higher than 9 weight per cent apparently do not increase the activity of the catalyst composition to a degree which justifies the expense of preparation and the use of catalysts employing such high proportions of this relatively expensive material.

The proportion of silica necessarily is limited to the amount which enhances the catalytic activity of the catalyst composition without substantially reducing the activity of the catalyst composition in the promotion of reactions such as dehydrogenation and aromatization. Preferably, the ratio of alumina to silica should be greater than 1:1, and ratios less than 3:7 ordinarily may not be employed without substantially altering the character of the catalyst composition and reducing its activity in the promotion of reactions for which the catalyst composition has a relatively high activity in the absence of silica. The beneficial effect of silica in the catalyst composition is obtained by the incorporation of amounts as small as 1 per cent or less of the silica in the catalyst decomposition. Ordinarily, however, larger amounts are preferred. In general, the silica and alumina should be employed in the improved catalyst composition in a weight ratio of alumina to silica in the range of 3:7 to 99:1. Within this range, however, it is found that relatively high proportions of silica impart to the catalyst composition a greater activity in the formation of carbon. In the preparation of catalysts for use in operations in which carbon formation is a serious factor it is desirable, therefore, to employ only the proportion of silica which is necessary to enhance the activity of the catalyst composition to the desired degree. For this reason it is undesirable ordinarily to employ a proportion of silica higher than that which produces catalyst compositions of maximum activity. Consequently, a weight ratio of alumina to silica in the range of 7:3 to 97:3 is satisfactory in the preparation of catalysts for most uses. In catalyst compositions comprising a small proportion of the activating oxide in combination with a carrier essentially consisting of alumina and silica it is found that the optimum weight ratio of alumina to silica is in the range of 4:1 to 19:1.

When employing alumina in the form of activated alumina or calcined aluminum hydrate in the preparation of the improved catalysts it is preferred to combine the silica therewith in the form of silica gel. Preferably, the silica gel should be mixed with the ingredients while in a state of substantial hydration. In order to obtain the advantages of the improved process to the fullest degree, the silica gel should be mixed with the other ingredients of the catalyst composition while containing at least 10 weight per cent of water. Preferably, the water of hydration of the silica gel should be at least 50 per cent, for example 85 to 95 per cent by weight.

The catalyst is prepared conveniently by a modification of the general method described above involving the formation of a paste. By this simple method silica gel in a state of substantial hydration, as described above, is intimately mixed with the other ingredients to form a paste or moist mass after which the method of preparation follows the general procedure described above. The catalyst also may be formed by first mixing silica gel with the alumina and forming the mixture into pellets which are then immersed in a suitable solution of a molybdenum compound. In the method of preparation involving the formation of a moist mass or paste, which is preferred because of its simplicity, the silica gel preferably is first mixed with the alumina, after which the paste is formed by combining the intimately mixed silica gel and alumina with the molybdenum compound solution.

The invention will be described further by reference to the preparation of specific catalysts which illustrate the various methods of preparation described above and by reference to the testing of such catalysts under uniform conditions to indicate the effect of such variations in the method of preparation on the activity of the catalysts.

In the preparation of these catalysts activated alumina sufficiently finely powdered to pass an 80-mesh screen and silica gel in various degrees of hydration and also sufficiently finely powdered to pass an 80-mesh screen were employed. The alumina and silica gel were mixed with a solution containing ammonium molybdate, the proportions of the ingredients being regulated to produce in the finished catalyst 6 weight per cent of $MoO_3$ and 5 weight per cent of $SiO_2$, the remainder being alumina. In the single preparation containing no silica the alumina was made into a paste directly with the ammonium molybdate. In all other preparations except the last two the alumina was first mixed with the silica gel, and the resulting mixture was then combined with the requisite amount of ammonium molybdate solution to form a paste or wet mass. In the last two preparations, which will be discussed specially, a different order of steps in combining the ingredients was employed. In all preparations the final moist mixture or paste was heated at 1200° F. for one hour and then after cooling, was formed into 1/8 inch pellets, 2 per cent graphite being added to facilitate pelleting. The graphite, however, had no effect on the catalytic activity and is ignored in the further consideration of the catalyst composition.

The variations in the preparation of the catalysts are given in Table I below in which there is indicated the catalyst number, the quantity of alumina employed and the water content thereof, the quantity of silica gel employed and the water content thereof, the quantity of ammonium molybdate employed, and the volume of the solution containing the ammonium molybdate.

TABLE I

| Catalyst Number | Alumina | | Silica Gel | | Ammonium Molybdate | |
|---|---|---|---|---|---|---|
| | Grams | Wt. Per Cent $H_2O$ | Grams | Wt. Per Cent $H_2O$ | Grams | c. c. Sol. |
| 270 | 600 | 6.2 | 0 | 0 | 44.2 | 280 |
| 422 | 604 | 11.6 | 31.2 | 4 | 44.2 | 400 |
| 432 | 604 | 11.6 | 34.1 | 12 | 44.2 | 400 |
| 500 | 583 | 8.4 | 49.9 | 39.8 | 44.2 | 375 |
| 472 | 583 | 8.4 | 69.1 | 56.6 | 44.2 | 385 |
| 478 | 583 | 8.4 | 259 | 88.4 | 44.2 | 375 |
| 467 | 927 | 11.6 | 400 | 88.4 | 67.7 | 300 |
| 469 | 068 | 8 | 300 | 88.4 | 50.8 | 500 |

In the preparation of catalyst No. 467, referred to in Table I, the silica gel was first creamed or slurred with 200 c. c. of water. The ammonium molybdate solution was then added to this cream, and these ingredients were thoroughly mixed. The mixture thus obtained was then intimately mixed with the alumina powder. The resulting moist mass was then further treated in the same manner as in the preparation of the other catalysts.

In the preparation of catalyst No. 469, referred to in Table I, the alumina powder was first mixed with the ammonium molybdate solution. The silica gel was creamed with 150 c. c. of water, and the material thus obtained was then mixed with the mixture of alumina and ammonium molybdate. The resulting moist mass was further treated in the same manner as in the preparation of the other catalysts.

The catalysts whose preparations are outlined in Table I were all tested under identical conditions in the treatment of a straight-run East Texas heavy naphtha having initial and end boiling points of 240° F. and 396° F., respectively. The naphtha contained 14 volume per cent aromatic hydrocarbons, 33 volume per cent naphthenes and no olefin hydrocarbons and had an octane member of 42.3 A. S. T. M. The naphtha was passed in the vapor form over the granular catalyst in a suitable reactor at a space velocity of 1 volume (liquid basis) per hour per volume of catalyst space. The reaction zone was surrounded by a lead bath which was maintained at a temperature of 950° F. The reactor was maintained under a gauge pressure of 200 pounds per square inch. Hydrogen was passed into the reactor with the naphtha charge at a rate of approximately 2400 cubic feet per barrel of naphtha.

Since it is known that molybdenum oxide catalysts sometimes do not display full activity in the initial test run and prior to the first regeneration of the catalyst, all test data given in this specification are limited to that obtained in the second operating runs on the catalysts, following an initial operating run and a regeneration treatment of each catalyst. In each regeneration treatment a regenerating gas consisting principally of nitrogen and other inert gases and containing 2 to 3 per cent of oxygen was passed through the reaction zone at the reaction temperature to ignite and burn carbonaceous deposits on the surfaces of the catalyst. This treatment was continued in each case until the temperatures in the reaction zone indicated that no further combustion was occurring. The regeneration treatment usually required about seven hours. Prior to the start of the operating run following the regeneration treatment a hydrogen-containing gas such as a product gas from a previous operation was passed through the reaction zone at the operating pressure and temperature for a period of about one hour. This treatment served to effect a preliminary reduction of the molybdenum oxide to a relatively more stable condition.

Comparative results from the testing of the various catalysts listed in Table I in the manner described above are set forth below in Table II.

TABLE II

| Catalyst Number | Composition, Wt. Percent | | | Weight Percent H₂O in Silica Gel | A. S. T. M. Octane Number |
|---|---|---|---|---|---|
| | MoO₃ | SiO₂ | Al₂O₃ | | |
| 270 | 6 | 0 | 94 | | 70.8 |
| 422 | 6 | 5 | 89 | 4 | 71.9 |
| 432 | 6 | 5 | 89 | 12 | 74.4 |
| 500 | 6 | 5 | 89 | 39.8 | 76.9 |
| 472 | 6 | 5 | 89 | 56.6 | 77.6 |
| 478 | 6 | 5 | 89 | 88.4 | 81.7 |
| 467 | 6 | 5 | 89 | 88.4 | 76.9 |
| 469 | 6 | 5 | 89 | 88.4 | 75.6 |

The data in Table II are arranged to show the effect, on the activity of the catalyst, of the condition of the silica during the preparation of the catalyst and the effect of the order of steps employed in combining the various ingredients of the catalyst composition. Catalyst No. 422 was prepared with silica gel containing only a small amount of water with the result that the substitution of 5 per cent of silica for a like amount of alumina produced an increase in octane number of 1 number. On the other hand, catalyst No. 432 was prepared with silica gel containing a fairly substantial amount of water with the result that an increase in octane number of 4 numbers was obtained. The use of silica gel containing increasing amounts of water in the preparation of catalysts Nos. 500, 472 and 478 produced further increases in the octane number of the naphtha to a maximum of 11 numbers above the octane number obtained with catalyst No. 270, which contained no silica. It is evident, therefore, that in combining silica directly with the alumina for the preparation of the improved catalyst the silica should be in the form of silica gel containing a substantial amount of water of hydration, for example, 10 weight per cent or more. Preferably, the amount of water in the silica gel should be 50 weight per cent or more, with best results being obtained with silica gel containing 85 to 95 weight per cent of water.

The data for catalysts Nos. 467 and 469 indicate that a certain order of steps in the mixing of the ingredients in this particular method of preparation of the improved catalyst is desirable to obtain the best results. In the preparation of catalyst No. 478 and the other catalysts containing silica listed above catalyst No. 478, the silica gel and alumina were first intimately mixed, after which the solution containing molybdenum compound was added to the mixture. This appears to be the best procedure to follow in this particular method of preparation of the catalyst. Catalyst No. 467 was prepared in a different order of steps in which the silica gel was combined first with the solution of ammonium molybdate, the alumina then being added to the mixture. Inferior results were obtained with this catalyst. Catalyst No. 469 was prepared with a still different order of steps in which the activated alumina was first combined with the ammonium molybdate solution, the silica gel then being added to the combination. The results obtained with this catalyst also were inferior, indicating that the order of steps employed in the preparation of catalyst No. 478 is to be desired. All further catalyst preparations described in this specification were made with the order of steps employed in the preparation of catalyst No. 478 in order to eliminate any variables which might otherwise result from a variation in the order of preparative steps.

The data in Table II indicate that when the alumina, in a form similar to that of activated alumina or calcined aluminum hydrate, is combined directly with the silica, the latter should be in the form of silica gel containing a substantial amount of water. Furthermore, a certain order of steps appears to be necessary in connection with this particular method of preparation in order to achieve the best results. It is to be understood, however, that the invention is not limited to the use of a catalyst containing alumina, silica and an activating oxide prepared by this method, but includes within its scope the use of any catalyst, comprising alumina and silica in a desired ratio in combination with an activating oxide, prepared by any method which imparts to the catalyst composition the improved characteristics which are the beneficial effect of the addition of silica to the composition.

To illustrate the effect of the addition of various amounts of silica to catalyst compositions comprising various amounts of molybdenum oxide, and to exemplify the addition of titania or iron oxide to the catalyst composition, reference is made to a number of catalyst preparations which were tested in the dehydrogenation and reforming treatment of the straight-run East Texas heavy naphtha in the manner described above.

In the preparation of these catalysts alumina, prepared by heating aluminum hydrate at 1200° F. for three hours, was first mixed with silica gel containing 86 to 88 weight per cent water, and the resulting mixture was then formed into a paste or moist mass by means of a solution containing ammonium molybdate in an amount sufficient to produce in the finished catalyst composition 2, 6 or 9 weight per cent of MoO₃ as desired. In the preparation of the catalysts containing no silica the alumina was made into a paste directly with the ammonium molybdate solution. The final moist mixture or paste was heated at 1200° F. for one hour and then, after cooling, formed into ⅛ inch pellets, 2 per cent of graphite being added to facilitate pelleting. The graphite, however, had no effect on the catalytic activity and is ignored in the further consideration of the catalyst compositions.

The silica gel employed was prepared by a method of which the following is an example. 15 gallons of sodium silicate, containing 28.5 per cent of SiO₂ and 8.85 per cent of Na₂O, were mixed with 15 gallons of distilled water. 3.2 gallons of technical grade 66° Baumé sulfuric acid were dissolved in 16.3 gallons of distilled water. The acid solution was allowed to cool to room temperature. The sodium silicate solution was then added to the acid solution with vigorous stirring. The mixture was allowed to stand for 24 hours. The gel formed was subdivided by passage through a ¾ inch screen and mixed with 35 gallons of distilled water. This mixture was allowed to stand for at least one hour, and the water was then removed. The gel was given 15 similar washes of 35 gallons each. The last wash water was not removed from the gel but was stored with it. The pH value of the wash water increased substantially from a value of 0.61 for the first wash water to 3.90 for the 15th wash water.

The variations in the preparation of the catalysts are given in Table III below in which there is indicated the catalyst number, the quantity of alumina employed and the water content thereof, the quantity of silica gel employed and the water content thereof, the quantity of ammonium molybdate employed, and the volume of the solution containing the ammonium molybdate.

TABLE III

| Catalyst Number | Alumina | | Silica Gel | | Ammonium Molybdate | |
|---|---|---|---|---|---|---|
| | Grams | Wt. Per Cent H₂O | Grams | Wt. Per Cent H₂O | Grams | c. c. Sol. |
| 518 | 596 | 1.4 | 0 | 0 | 14.7 | 460 |
| 502 | 595 | 2.1 | 48.4 | 87.6 | 14.7 | 475 |
| 491 | 565 | 1.3 | 224 | 86.6 | 14.7 | 485 |
| 530 | 571 | 4.8 | 349 | 87.1 | 14.7 | 490 |
| 504 | 532 | 0.7 | 484 | 87.6 | 14.7 | 325 |
| 531 | 542 | 4.8 | 538 | 87.1 | 14.7 | 465 |
| 505 | 471 | 0.7 | 968 | 87.6 | 14.7 | 280 |
| 501 | 576 | 2.1 | 0 | 0 | 44.1 | 450 |
| 485 | 561 | 0.6 | 51.7 | 88.4 | 44.1 | 480 |
| 486 | 555 | 0.6 | 103.4 | 88.4 | 44.1 | 480 |
| 484 | 537 | 0.6 | 259 | 88.4 | 44.1 | 465 |
| 488 | 511 | 1.3 | 449 | 86.6 | 44.1 | 445 |
| 533 | 496 | 4.8 | 474 | 87.1 | 44.1 | 420 |
| 489 | 450 | 1.3 | 895 | 86.6 | 44.1 | 395 |
| 510 | 266 | 0.7 | 2420 | 87.6 | 44.1 | 700 |
| 511 | 30.2 | 0.7 | 4310 | 87.6 | 44.1 | 350 |
| 695 | 550 | 1.1 | 0 | 0 | 66.2 | 400 |
| 506 | 544 | 0.7 | 48.4 | 87.6 | 66.2 | 420 |
| 507 | 538 | 0.7 | 96.8 | 87.6 | 66.2 | 420 |
| 487 | 518 | 0.4 | 259 | 88.4 | 66.2 | 445 |
| 508 | 489 | 0.7 | 484 | 87.6 | 66.2 | 325 |
| 509 | 429 | 0.7 | 968 | 87.6 | 66.2 | 280 |

The catalysts whose preparations are outlined in Table III were tested in the treatment of the straight-run East Texas naphtha in the manner described above. The results obtained in such test operations are set forth in Table IV below. Only test data obtained in the second operating run with the catalyst, that is, after a preliminary run and the first regeneration of the catalyst, are included in Table IV.

TABLE IV

| Catalyst Number | Catalyst Composition, Wt. Per Cent | | | | | A. S. T. M. Octane Number |
|---|---|---|---|---|---|---|
| | MoO₃ | SiO₂ | TiO₂ | Fe₂O₃ | Al₂O₃ | |
| 518 | 2 | 0 | 0 | 0 | 98 | 66.5 |
| 502 | 2 | 1 | 0 | 0 | 97 | 68.2 |
| 491 | 2 | 5 | 0 | 0 | 93 | 71.0 |
| 530 | 2 | 7.5 | 0 | 0 | 90.5 | 74.6 |
| 504 | 2 | 10 | 0 | 0 | 88 | 77.6 |
| 531 | 2 | 12 | 0 | 0 | 86 | 76.9 |
| 505 | 2 | 20 | 0 | 0 | 78 | 75.4 |
| 501 | 6 | 0 | 0 | 0 | 94 | 76.8 |
| 485 | 6 | 1 | 0 | 0 | 93 | 77.8 |
| 486 | 6 | 2 | 0 | 0 | 92 | 79.6 |
| 484 | 6 | 5 | 0 | 0 | 89 | 81.2 |
| 488 | 6 | 10 | 0 | 0 | 84 | 81.8 |
| 533 | 6 | 15 | 0 | 0 | 79 | 81.5 |
| 489 | 6 | 20 | 0 | 0 | 74 | 79.7 |
| 510 | 6 | 50 | 0 | 0 | 44 | 76.8 |
| 511 | 6 | 89 | 0 | 0 | 5 | 59.0 |
| 583 | 6 | 20 | 10 | 0 | 64 | 82.5 |
| 695 | 9 | 0 | 0 | 0 | 91 | 79.9 |
| 506 | 9 | 1 | 0 | 0 | 90 | 81.0 |
| 507 | 9 | 2 | 0 | 0 | 89 | 81.8 |
| 487 | 9 | 5 | 0 | 0 | 86 | 82.6 |
| 508 | 9 | 10 | 0 | 0 | 81 | 83.6 |
| 509 | 9 | 20 | 0 | 0 | 71 | 81.5 |
| 538 | 9 | 10 | 0 | 5 | 76 | 85.9 |

In Table IV the data are arranged to show the effect on the activity of the catalyst, as reflected by the octane number of the gasoline product, of the incorporation of various amounts of silica in the catalyst composition. In Table IV the data are also arranged to place the catalysts having the same content of molybdenum oxide in groups to show the effect of varying the silica content. Since the molybdenum oxide content of each group of catalysts is uniform the incorporation of the silica is in effect a substitution of silica for a portion of the alumina.

The data for catalysts Nos. 518 and 502 show that the incorporation, or substitution, of 1 per cent silica in the catalyst composition ordinarily comprising 98 per cent alumina and 2 per cent molybdenum oxide produces a substantial increase in the octane number of the gasoline product. The incorporation of increasing amounts of silica in the catalyst composition, in catalysts Nos. 491, 530 and 504, effects further increases in the activity of the catalyst composition, as shown by the consistent increases in the octane numbers of the gasoline products to a maximum increase of 11 numbers which is achieved by the incorporation of 10 per cent silica in catalyst No. 504. Further increases in the amount of silica as illustrated by catalysts Nos. 531 and 505 resulted in slight decreases in activity, indicating that for this particular catalyst composition the optimum percentage of silica is about 10 per cent, although all of the various additions of silica from 1 to 20 per cent produced catalysts more active than catalyst No. 518 which contained no silica.

Referring in Table IV to the group of catalysts containing 6 per cent molybdenum oxide, it is seen that the incorporation of small amount of silica in the catalyst composition produced substantial increases in activity and that a maximum activity, as indicated by the octane number of the gasoline product, was obtained with the incorporation of about 10 per cent of silica in the catalyst composition. In this group of catalysts the increases in activity by the additions of silica are indicated by smaller numerical increases in the octane numbers of the gasoline products. This is to be expected, however, since catalyst No. 501, containing 6 per cent molybdenum oxide, was substantially more active than catalyst No. 518, containing 2 per cent molybdenum oxide. In the group of catalysts having 6 per cent molybdenum oxide it is to be noted that, while the maximum octane number was obtained with catalyst No. 488 containing 10 per cent silica, improved activity is exhibited by catalysts in this group having a wide range of proportions of silica. For example, catalyst No. 486 containing 2 per cent silica and 92 per cent alumina and catalyst No. 489 containing 20 per cent silica and 74 per cent alumina produced gasoline of the same octane number, which was three numbers higher than that of the gasoline produced by catalyst No. 501 which contained no silica. In this group of catalysts the only one exhibiting a lower activity as a result of the substitution of the silica for alumina is No. 511 which contained 89 per cent silica and 5 per cent alumina, which is, of course, far outside the range of compositions employed in the catalysts of the invention. It is evident that the incorporation of so large a proportion of silica in catalyst No. 511 with a corresponding drastic reduction in the proportion of alumina in the catalyst, has produced a composition having properties different from those of the alumina-molybdenum oxide catalyst containing no silica, such as catalyst No. 501. Evidently the dehydrogenating activity of the alumina-molybdenum oxide composition has been substantially reduced by the incorporation of so large a proportion of silica. The activity of catalyst No. 511 is at about the same level as alumina alone and but little higher than that of a composition similar to that of catalyst No. 511 minus the molybdenum oxide.

As a part of the data relating to catalysts having 6 per cent molybdenum oxide there are included in Table IV operating results from the testing of catalyst No. 583 containing, in addition to alumina, molybdenum oxide and silica, a substantial proportion of titania. This catalyst was prepared as follows:

*Catalyst No. 583.*—100 pounds of titania acid cake were stirred with 20 gallons of softened water. The resulting slurry was filtered in a press and was washed in the press with 200 gallons of water. The resulting moist cake contained 58.2 per cent water. 143.5 grams of the material thus obtained were intimately mixed with 398 grams of alumina, containing 3.8 per cent water, obtained by heating aluminum hydrate for three hours at 1200° F., and 890 grams of silica gel containing 87.1 per cent water. The resulting mixture was made into a paste with 425 c. c. of a solution containing 44.1 grams of ammonium molybdate. The paste was heated at 1200° F. for one hour. After cooling the catalyst composition was made into $\frac{3}{16}$ inch pellets containing 2 per cent graphite. The composition of this catalyst by weight was $Al_2O_3$—64 per cent, $MoO_3$—6 per cent, $SiO_2$—20 per cent, and $TiO_2$—10 per cent.

Catalyst No. 583 was tested in the same manner as the other catalysts whose preparation is described in Table III, and the results, as set forth in Table IV, indicate that the addition of titania to the catalyst already containing silica produced a further increase in activity, as reflected by an increase in octane number. This apparently is not a mere cumulative effect since the addition of a further and equivalent amount of silica, instead of the titania, did not produce an increase in activity, and since the addition of titania to an alumina-molybdenum oxide catalyst containing no silica is substantially less beneficial than the addition of an equivalent proportion of silica.

Referring in Table IV to the series of catalysts containing 9 per cent molybdenum oxide, it is seen that the addition of silica to the catalyst, as a partial replacement of alumina, produced an increase in the activity of the catalyst, as reflected by an increase in the octane number of the gasoline product obtained. This beneficial result was obtained even though the activity of catalyst No. 695, consisting of 91 per cent alumina and 9 per cent molybdenum oxide, represents substantially the optimum combination of these ingredients in an alumina-molybdenum oxide catalyst containing no silica. As in the case of the catalysts containing 6 per cent and 2 per cent of molybdenum oxide, the incorporation of increasing amounts of silica in the catalysts containing 9 per cent molybdenum oxide produces further increases in the activity of the catalysts, as reflected by the octane numbers of the products, to a maximum activity which was obtained by the incorporation of about 10 per cent silica. The octane number of the gasoline obtained with catalyst No. 508, containing 10 per cent silica, was almost three numbers higher than obtained with catalyst No. 695, containing no silica. While this increase is numerically smaller than the increases obtained by the incorporation of the same proportion of silica in catalysts containing 2 and 6 per cent molybdenum oxide, the increase represented by catalyst No. 508 is substantially as impressive, if not more so, in view of the initial high level of activity exhibited by catalyst No. 695.

The incorporation of amounts of silica substantially larger than 10 per cent, as represented by catalyst No. 508, apparently produces smaller increases than the addition of 10 per cent of silica to the catalyst. However, it should be noted that, while amounts of silica substantially greater than 10 per cent in the catalyst containing 9 per cent molybdenum oxide apparently are excessive if maximum octane number is desired, the activity of such catalysts containing amounts of silica substantially larger than 10 per cent, as represented by catalyst No. 509, is still substantially above that of the catalysts containing no silica, as represented by catalyst No. 695.

As an illustration of the effect of the addition of iron oxide to the alumina-silica-molybdenum oxide catalyst test data for catalyst No. 538 are included in Table IV. This catalyst was prepared as follows:

*Catalyst No. 538.*—460 grams of alumina prepared by heating alumina hydrate at 1200° F. for 13 hours and containing 0.9 per cent water were mixed with 30 grams of iron oxide ($Fe_2O_3$) and 465 grams of silica gel containing 87.1 weight per cent water. These ingredients were intimately mixed, and to the resulting mixture were added 325 c.c. of a solution containing 66.2 grams of ammonium molybdate. The resulting moist mass was heated at 1200° F. for one hour and after cooling was made into $\frac{3}{16}$ inch pellets containing 2 per cent graphite. This catalyst had the following composition in weight per cent: $Al_2O_3$—76 per cent, $SiO_2$—10 per cent, $MoO_3$—9 per cent, and $Fe_2O_3$—5 per cent.

Catalyst No. 538 was tested in the same manner as the other catalysts listed in Table IV, and the test data indicate a substantial further increase in activity of the catalyst, apparently due to the incorporation of the iron oxide. Comparing catalyst No. 538 with catalyst No. 508, the latter representing apparently the optimum combination of alumina, silica and molybdenum oxide, it is found that the substitution of 5 weight per cent iron oxide for an equivalent quantity of the alumina, as in catalyst No. 538, apparently produced a substantial increase in activity, as represented by an increase in octane number of the product of over two numbers to 85.9. By comparing catalyst No. 538 with catalyst No. 695 it is seen that the substitution of 10 weight per cent silica and 5 weight per cent iron oxide for an equivalent quantity of the alumina in catalyst No. 695 produced an impressive increase in activity, as represented by an increase of six numbers in the octane number of the gasoline product obtained. This result is not cumulative since the incorporation of this amount of iron oxide in an alumina-molybdenum oxide catalyst containing no silica ordinarily lowers the activity of the catalyst.

The superior activity exhibited by the improved catalysts listed in Table IV apparently results, in part at least, from improvements in the activity of the catalyst in the promotion of dehydrogenation, cyclization and aromatization reactions, as evidenced by the increase in the concentration of aromatic hydrocarbons in the gasoline products of the more active catalysts. For example, the debutanized gasoline product of catalyst No. 518 contained 35.2 volume per cent aromatic hydrocarbons, whereas the corresponding figures for catalysts Nos. 491 and 504 were 41.6 and 48.6. The debutanized gasoline product of catalyst No. 501 contained 52.4 volume per cent of aromatic hydrocarbons, whereas the aromatic content of the gasoline product of catalyst No. 484 was 54.1 volume per cent. The debutanized gasoline product of catalyst No. 695 contained 54.1 volume per cent of aromatic hydrocarbons, whereas the corresponding figure for catalyst No. 506 was 58.2 volume per cent.

The improved catalyst has two important applications in hydrocarbon conversion processes ordinarily employing catalysts comprising alumina and activating oxides such as molybdenum oxide. One application of the improved catalyst to such hydrocarbon conversion processes is the employment of a catalyst comprising alumina, molybdenum oxide and silica in the proportions which impart to the catalyst the maximum activity for the reactions involved in the hydrocarbon conversion process. This ordinarily involves the use of a proportion of molybdenum oxide corresponding to the proportion which imparts maximum activity to an alumina-molybdenum oxide catalyst containing no silica.

A second application of the improved catalyst involves a hydrocarbon conversion operation employing a catalyst comprising alumina and a proportion of an activating oxide which, in the absence of silica, would impart to the catalyst composition a substantially lower activity than that which would result from the employment of a greater proportion of the activating oxide. In this application of the invention, however, the activity of the catalyst comprising a relatively low proportion of the activating oxide, such as molybdenum oxide, is maintained at a relatively high level by reason of the presence in the catalyst composition of a substantial proportion of silica.

In the last-mentioned application of the invention the hydrocarbon conversion process is promoted by a catalyst containing a relatively low proportion of the activating oxide, the activity of the catalyst being maintained at a relatively high level by reason of the presence therein of a substantial proportion of silica. This application of the invention has many advantages arising out of the use of relatively low proportions of the activating oxides. Since the activating oxides ordinarily cost substantially more per unit of weight than any other ingredient of the catalyst composition this application of the invention permits a substantial saving in the cost of the catalyst. This application of the invention also has the advantage that it minimizes the oxygen and hydrogen requirements of the process which are attributable to the oxidation and reduction of the catalyst and also minimizes the formation of water in the reactor.

The use of catalysts comprising small proportions of the oxidizable and reducible activating oxides which is made possible by the incorporation of silica therein in accordance with this invention substantially eliminates the objection to the use of catalysts comprising such activating oxides in hydrocarbon conversion operations involving short operating cycles and frequent regenerative steps since such objections have been based on the relatively large requirement in oxygen and hydrogen which would accompany conversion operations involving frequent regenerations of alumina catalysts containing the proportions of activating oxides which are necessary to impart satisfactory activity to the catalyst in the absence of silica.

The two applications of the improved process are illustrated in Table V below in which there are arranged for easy comparison operating data already presented in Table IV, as well as additional data. In Table V the data are arranged to show the effect of changes in catalyst composition on the octane number, gasoline yield and carbon formation resulting from the use of the various catalysts in the treatment of the East Texas heavy naphtha in the manner previously described.

TABLE V

| Catalyst Number | Catalyst Composition, Wt. percent | | | Octane Number | Vol. percent Gasoline | Wt. percent Carbon |
|---|---|---|---|---|---|---|
| | $MoO_3$ | $SiO_2$ | $Al_2O_3$ | | | |
| 518 | 2 | 0 | 98 | 66.5 | 92.4 | 0.4 |
| 622 | 1 | 15 | 84 | 66.4 | 94.1 | 0.6 |
| 501 | 6 | 0 | 94 | 76.8 | 87.3 | 0.6 |
| 504 | 2 | 10 | 88 | 77.6 | 90.6 | 0.8 |
| 485 | 6 | 1 | 93 | 77.8 | 88.8 | 0.5 |
| 523 | 8 | 0 | 92 | 79.2 | 88.0 | 0.8 |
| 695 | 9 | 0 | 91 | 79.9 | 85.7 | 0.8 |
| 486 | 6 | 2 | 92 | 79.6 | 87.5 | 0.7 |
| 484 | 6 | 5 | 89 | 81.2 | 87.2 | 0.7 |
| 506 | 9 | 5 | 86 | 82.6 | 87.4 | 1.0 |

The preparation of all the catalysts listed in Table IV has been described above with the exception of catalysts Nos. 622 and 523. These catalysts were prepared as follows:

*Catalyst No. 622.*—To 523 grams of alumina prepared by heating aluminum hydrate for three hours at 1200° F. and containing 3.6 weight per cent water were added 666 grams of finely divided silica gel containing 86.5 weight per cent water. These ingredients were mixed thoroughly, and to the mixture were added 450 c.c. of a solution containing 7.4 grams of ammonium molybdate. The resulting paste was heated at 1200° F. for one hour. After cooling, the catalyst was made into $\tfrac{1}{8}$ inch pellets containing 2 per cent graphite. The finished catalyst had the following composition in weight per cent: $Al_2O_3$—84 per cent, $SiO_2$—15 per cent and $MoO_3$—1 per cent.

*Catalyst D-523.*—560 grams of alumina prepared by heating aluminum hydrate for three hours at 1200° F. and containing 1.4 weight per cent water were mixed with 430 c.c. of a solution containing 58.8 grams of ammonium molybdate. The moist mass was heated at 1200° F. for one hour and then was made into $\tfrac{1}{8}$ inch pellets with a 2 per cent graphite. This catalyst consisted of 92 weight per cent $Al_2O_3$ and 8 weight per cent $MoO_3$.

Referring in Table V to the data for catalysts Nos. 518 and 622, it will be noted that catalyst No. 622, which contained one-half the amount of molybdenum oxide in catalyst No. 518, was substantially as active, apparently by reason of the presence of 15 per cent silica and is otherwise satisfactory.

Referring in Table V to the data for catalysts Nos. 501, 504 and 485, will be noted that catalyst No. 504, containing one-third the quantity of molybdenum oxide contained in catalyst No. 501, gave equivalent results, the slightly greater carbon formation being compensated for by higher octane number. The data for catalyst No. 485 demonstrates that by maintaining the percentage of molybdenum oxide the same as in catalyst No. 501 and incorporating a relatively minor proportion of silica the results are improved as to octane number and carbon formation.

Referring in Table V to the last group of catalysts, catalysts Nos. 523 and 695 represent alumina-molybdenum oxide catalysts of optimum activity since catalysts having higher percentages of the molybdenum oxide ordinarily do not exhibit higher activity. By the incorporation of a minor percentage of silica, as in catalyst No. 486, the molybdenum oxide content may be substantially reduced without impairing the activity of the catalyst. Catalyst No. 486 containing 25 to 33 per cent less molybdenum oxide than catalysts Nos. 523 and 695 produced results in the reforming of the naphtha at least as good as did the catalysts containing the larger amounts of molybdenum oxide. In catalyst No. 486 the incorporation of the small percentage of silica permitted a substantial reduction of molybdenum oxide content without impairing the activity of the catalyst. Catalyst No. 486 thus represents a reduction in the cost of the catalyst because of the smaller percentage of the relatively expensive molybdenum oxide employed, and permits more economical operation.

In Table V the data for catalyst No. 484 represent an operation involving both applications of the invention, since cataylst No. 484 contains the same reduced quantity of molybdenum oxide as catalyst No. 486, wherefore the advantages of catalyst No. 486 in that connection are present also in catalyst No. 484. Catalyst No. 484 also contains silica in somewhat larger proportion than catalyst No. 486, as a consequence of which the activity of cataylst No. 484 is substantially greater than that of catalyst No. 486 or catalysts Nos. 523 and 695, as represented by a higher octane number in the gasoline product of the operation. In Table V the data for catalyst No. 506 represent the application of the invention in which the proportion of molybdenum oxide in the catalyst is maintained at about the optimum figure and the activity of the catalyst is further enhanced by the incorporation of a substantial proportion of silica. Comparing the data for catalysts Nos. 695 and 506, it is seen that the incorporation of 5 per cent of silica in the latter cataylst produced an increase in the octane number of the gasoline product which is substantial in view of the relatively high level of the actane numbers involved.

To illustrate the application of the invention to catalysts comprising activated alumina reference is made to the preparation and testing of four catalysts which demonstrate the effect of modifying an alumina-molybdenum oxide catalyst by the incorporation of silica, by the incorporation of silica and titania and by the incorporation of silica, titania and iron oxide. These catalysts were prepared as follows:

*Catalyst No. 270.*—600 grams of activated alumina sufficiently finely divided to pass an 80-mesh screen were made into a stiff paste with 280 c. c. of a solution containing 44.2 grams of ammonium molybdate. The moist paste was heated at 1200° F. for one hour and when cooled was made into $\frac{3}{16}$ inch pellets. The cataylst contained 6 weight per cent $MoO_3$ and 94 weight per cent $Al_2O_3$.

*Catalyst No. 345.*—586 grams of activated alumina, containing 8.9 per cent water, and sufficiently finely divided to pass an 80-mesh screen were thoroughly mixed with 67 grams of hydrated silicic acid containing 55.2 weight per cent of water. The resulting mixture was then made into a paste with 400 c. c. of solution containing 44.2 grams of ammonium molybdate. The paste was heated at 1200° F. for one hour and was then made into $\frac{3}{16}$ inch pellets. The completed catalyst had the following composition by weight: $Al_2O_3$—89 per cent, $MoO_3$—6 per cent and $SiO_2$—5 per cent.

*Catalyst No. 348.*—171 grams of titania acid cake containing 87.8 weight per cent solids was washed six times by filtering with 650 c. c. of water in each wash. At the conclusion of the sixth wash the filtrate was still definitely acid. The washed cake was then dried at 110° C. to a water content of 4 weight per cent. 31.3 grams of the material thus obtained were thoroughly mixed with 553 grams of activated alumina sufficiently finely divided to pass an 80-mesh screen and containing 8.9 per cent water, and 67 grams of hydrated silicic acid containing 55.2 weight per cent water. The resulting mixture was made into a paste with 400 c. c. of solution containing 44.2 grams of ammonium molybdate. The paste was heated at 1200° F. for one hour and was then made into $\frac{3}{16}$ inch pellets. The catalyst had the following composition by weight: $Al_2O_3$—84 per cent, $MoO_3$—6 per cent, $SiO_2$—5 per cent, and $TiO_2$—5 per cent.

*Catalyst No. 378.*—31.2 grams of the water washed titania acid cake employed in catalyst No. 348 were carefully mixed with 527 grams of activated alumina containing 8.9 per cent water and sufficiently finely divided to pass an 80-mesh screen, 133.8 grams of hydrated silicic acid containing 55.2 weight per cent water, and 30 grams of ferric oxide. This mixture was made into a paste with 450 c. c. of solution containing 47 grams of ammonium molybdate. The moist paste was heated at 1200° F. for one hour, and after cooling the dried material was made into $\frac{3}{16}$ inch pellets. This catalyst had the following composition by weight: $Al_2O_3$—75.2 per cent, $MoO_3$—6.0 per cent, $SiO_2$—9.4 per cent, $TiO_2$—4.7 per cent, and $Fe_2O_3$—4.7 per cent.

These catalysts were tested under identical conditions in the reforming of naphtha to convert it to a gasoline product of high anti-knock value. The results of these tests are set forth below in Table VI in which the data are arranged to show the effect of the catalyst composition on the activity as reflected by the octane number of the gasoline product.

TABLE VI

| Catalyst Number | Catalyst Composition, Wt. Per Cent | | | | | Octane Number |
| --- | --- | --- | --- | --- | --- | --- |
| | $MoO_3$ | $SiO_2$ | $TiO_2$ | $Fe_2O_3$ | $Al_2O_3$ | |
| 270 | 6 | 0 | 0 | 0 | 94 | 70.8 |
| 345 | 6 | 5 | 0 | 0 | 89 | 75.8 |
| 348 | 6 | 5 | 5 | 0 | 84 | 76.8 |
| 378 | 6 | 9.4 | 4.7 | 4.7 | 75.2 | 80.4 |

Referring in Table VI to catalysts Nos. 270 and 345, it is seen that the incorporation of 5 per cent silica produced a more active catalyst, as shown by the increased octane number obtained with catalyst No. 345. Referring to catalyst No. 348, it is seen that the addition of titania to the composition represented by catalyst No. 345 produced a still further increase in the octane number of the gasoline. Maximum activity in this series was obtained with catalyst No. 378 which contained substantial proportions of titania and iron oxide in addition to the silica, molybdenum oxide and alumina.

In the foregoing specific examples of the application of the process, to the treatment of naphtha to produce gasoline of higher anti-knock value, uniform operating conditions are employed to permit a comparison of the results obtained. In the application of the invention to the treatment of naphtha the reaction conditions necessarily must be selected with reference to the character of the hydrocarbons being treated, the results desired and the composition of the catalyst. Treatment of naphtha for this purpose should be carried out at temperatures of 850° F. to 1050° F. Within this temperature range space velocities of 0.1 to 3.0 volumes of liquid per volume of catalyst space per hour may be employed advantageously. Hydrogen is circulated through the reaction zone as in the foregoing specific examples, and this operation may be carried out on a recycling basis since hydrogen is produced in the process. Hydrogen is recycled in the amount of 0.5 to 9.0, preferably 3.0, molecules of hydrogen per molecule of hydrocarbon reactants. The hydrogen may be in admixture with light gaseous hydrocarbons. The recycling of hydrogen in this manner is advantageous, particularly when the reaction zone is maintained under a hydrogen pressure of 30 to 450 pounds per square inch gauge, in maintaining the activity of the catalyst.

While the invention has been described by reference to specific examples involving the treatment of a specific mixture of hydrocarbons, the invention is also applicable to the treatment of other mixtures of hydrocarbons or individual hydrocarbons. For example, the invention includes the treatment of individual aliphatic hydrocarbons such as normal heptane to effect conversion thereof to heptene and toluene. Normally gaseous hydrocarbons also are treated in accordance with the improved process. For example, butane is treated to effect dehydrogenation thereof to butene, or butene is dehydrogenated to butadiene. In addition to the production of simple aromatic hydrocarbons, as by treatment of naphthenic or aliphatic hydrocarbons such as heptane, the process is applicable to the production of more highly cyclicized hydrocarbons such as naphthalene and anthracene.

While the foregoing specific examples of the improved conversion process involved the use of a fixed bed of granular catalyst, through which the reaction mixture and the regenerating gases were passed alternately, it is evident that the invention is not limited to operations employing the improved catalyst in a static condition. The improved process involves as well the use of the catalyst in granular or powdered form is a moving body. In this method of operation the catalyst mass moves downwardly, either continuously or intermittently, through the reactor as the result of continuous or periodic removal of a portion of the catalyst mass at the bottom of the reactor and corresponding replenishment with fresh or regenerated catalyst at the top of the reactor. In another application of the invention the powdered catalyst is suspended in the stream of reactants and thus passed through the reaction zone with the reactants. In another method of operation the powdered catalyst is maintained as a fluidized, or pseudo-fluid, mass in the reaction zone by the passage of the vaporized reactants upwardly therethrough. Continuous addition and withdrawal of catalyst is effected by suspension of catalyst in the flowing stream of reactants and by direct addition and withdrawal by means independent of the stream of reactants. In all the operations involving the use of the catalyst in a non-static condition substantially continuous operation is attained in a single reactor, the withdrawn catalyst being regenerated, or otherwise treated, outside the reactor and returned for further use in the reactor without interrupting the flow of reactants therethrough.

I claim:

1. The hydrocarbon conversion process which comprises contacting a hydrocarbon at elevated temperature with a catalyst composition comprising a synthetic mixture of alumina, silica, iron oxide and an oxide of a metal of the left-hand columns of groups IV, V and VI of the periodic table.

2. The hydrocarbon conversion process which comprises contacting a hydrocarbon at elevated temperature with a catalyst composition comprising a synthetic mixture of alumina, silica, titania and an oxide of a metal of the left-hand columns of groups IV, V and VI of the periodic table other than titania.

3. The hydrocarbon conversion process which comprises contacting a hydrocarbon at elevated temperature with a catalyst composition comprising a synthetic mixture of alumina, silica, titania, iron oxide and an oxide of a metal of the left-hand columns of groups IV, V and VI of the periodic table other than titania.

EDWIN T. LAYNG.

REFERENCES CITED

The following references are of record in the file of this patent:

UNITED STATES PATENTS

| Number | Name | Date |
|---|---|---|
| 2,212,034 | Morrell et al. | Aug. 20, 1940 |
| 2,216,262 | Bloch et al. | Oct. 1, 1940 |
| 2,275,441 | Kanhofer | Mar. 10, 1942 |
| 2,280,649 | Kanhofer | Apr. 21, 1942 |
| 2,288,336 | Welty, Jr. et al. | June 30, 1942 |
| 2,307,610 | Thomas | Jan. 5, 1943 |
| 2,317,803 | Reeves et al. | Apr. 27, 1943 |
| 2,328,754 | Thomas | Sept. 7, 1943 |
| 2,343,852 | Grosse et al. | Mar. 7, 1944 |

OTHER REFERENCES

Burgin et al.: "Dehydrogenation . . . Paraffins," Nat. Petrol. News, Sept. 7, 1938, pp. R-432-437.

Certificate of Correction

Patent No. 2,487,563                         November 8, 1949

EDWIN T. LAYNG

It is hereby certified that errors appear in the printed specification of the above numbered patent requiring correction as follows:

Column 4, lines 31 and 61, column 5, line 51, column 6, lines 73 and 74, and column 10, lines 11 and 12, for "activated alumina" read *Activated Alumina*; column 8, line 43, for the word "member" read *number*; column 12, line 31, for "amount" read *amounts*; column 16, Table V, sixth column thereof, for "88.0" read *86.0*; column 17, line 42, for "actane" read *octane*; column 19, line 50, for "is" read *in*;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*